(12) United States Patent
Erdmann et al.

(10) Patent No.: US 10,643,218 B1
(45) Date of Patent: May 5, 2020

(54) PERSISTING ADVERTISEMENT DATA ON A CONSUMER DEVICE

(75) Inventors: David Erdmann, Edmonds, WA (US); Andrew S. Craft, Seattle, WA (US)

(73) Assignee: Amazon Technologies, Inc.

( * ) Notice: Subject to any disclaimer, the term of this patent is extended or adjusted under 35 U.S.C. 154(b) by 1868 days.

(21) Appl. No.: 12/618,364

(22) Filed: Nov. 13, 2009

(51) Int. Cl.
  *G06Q 30/00* (2012.01)
  *G06Q 30/02* (2012.01)
(52) U.S. Cl.
  CPC ............ *G06Q 30/01* (2013.01); *G06Q 30/02* (2013.01)
(58) Field of Classification Search
  CPC ............................... G06Q 30/01; G06Q 30/02
  See application file for complete search history.

(56) References Cited

U.S. PATENT DOCUMENTS

| | | | |
|---|---|---|---|
| 7,620,404 B2 * | 11/2009 | Chesnais et al. | 455/456.1 |
| 7,873,708 B2 * | 1/2011 | Durand et al. | 709/219 |
| 8,005,904 B2 * | 8/2011 | Yokoyama et al. | 709/206 |
| 8,045,204 B2 * | 10/2011 | Henry et al. | 358/1.15 |
| 2002/0138633 A1 * | 9/2002 | Angwin et al. | 709/229 |
| 2006/0178918 A1 * | 8/2006 | Mikurak | 705/7 |
| 2007/0266156 A1 * | 11/2007 | Wilkins | G06F 17/30879 709/225 |
| 2008/0262929 A1 * | 10/2008 | Behr | 705/14 |
| 2009/0076902 A1 * | 3/2009 | Grinsted et al. | 705/14 |
| 2009/0240586 A1 * | 9/2009 | Ramer et al. | 705/14 |
| 2010/0030858 A1 * | 2/2010 | Chasin | 709/206 |
| 2010/0332404 A1 * | 12/2010 | Valin | 705/310 |

OTHER PUBLICATIONS

Alden et al. "vCard: the Electronic Business Card Version 2.1" Sep. 18, 1996, IBM Corp, Lucent Technologies, Inc., 52 pages.

* cited by examiner

*Primary Examiner* — Colleen A Hoar
(74) *Attorney, Agent, or Firm* — Lee & Hayes, P.C.

(57) ABSTRACT

Technologies are described herein for persisting advertisement data on a computing device and tracking consumer access to the advertisement data. A web-based advertisement viewed by a consumer on a consumer computing device contains a hyperlink or clickable control allowing the consumer to request advertisement data regarding a product or service offered in the ad. If the consumer clicks the hyperlink or control, a data object containing the advertisement data is delivered to the consumer computing device for storage on the device as a contact. Access to the contact containing the advertisement data by the consumer computing device may be tracked as well as access to a landing page referenced in the stored contact.

25 Claims, 5 Drawing Sheets

PERSISTING ADVERTISEMENT DATA ON A CONSUMER DEVICE

BACKGROUND

Many websites available over the World Wide Web ("the web") contain web-based advertisements ("ads") that are delivered to the consumer along with the content of a webpage. These web-based ads often contain branding graphics and information regarding specific products or services, and allow a user to click an embedded link or an area of the ad's display to be taken to an informational webpage regarding the products or services. The advertiser may evaluate the effectiveness of a web-based ad according to a click-through rate obtained by dividing the number of times a consumer clicks on the ad by the number of times the ad was delivered to all consumers over a period of time.

When browsing content on the web through a web browser application, a consumer may be presented with a web-based ad offering a product or service in which the consumer is interested. Nonetheless, the consumer may not want to divert attention away from their current task in order to click the embedded link or ad display at that particular time. The consumer may be able to "bookmark" the ad and/or the corresponding informational webpage by using a context menu or toolbar button of the web browser application to add the uniform resource locator ("URL") for the webpage to the consumer's favorites list. This option may not be available for every web-based advertisement, however, depending on the web browser application or the format in which the content of the ad was delivered. For instance, it may be difficult to bookmark a link embedded in a web-based ad presented in FLASH from Adobe Systems of Mountain View, Calif., or other non-HTML format.

In addition, bookmarking the web-based ad may only save a cryptic URL and, possibly, a title for the informational webpage or link on the consumer's computer. Moreover, the bookmarks may only be accessible from within the web browser application, and may not be searchable by local search engines on the consumer's computer or shareable with other of the consumer's devices. It is with respect to these and other considerations that the disclosure made herein is presented.

DETAILED DESCRIPTION

The following detailed description is directed to technologies for persisting advertisement data on a computing device and tracking consumer access to the advertisement data. According to embodiments, a consumer may view a web-based advertisement on a webpage utilizing a web browser application or other client application executing on the consumer's device. The web-based ad may contain an embedded link or clickable icon that, when selected by the consumer, delivers advertisement data corresponding to the product or service offered in the ad to the consumers' device. The advertisement data may contain an URL for an informational webpage related to the product or service, along with contact information for the advertiser, a graphical logo or branding image, text or other searchable content regarding the advertiser, product, or service, and other types of information. The advertisement data may be delivered to the consumer's device out-of-band such that the content being viewed by the consumer in the web browser application is undisturbed.

The advertisement data is delivered to the device in a format that allows the data to be easily stored, searched, accessed, and otherwise managed by the consumer on an ongoing basis. According to one embodiment, the advertisement data is delivered to the consumer's computing device in a format that may be stored as a contact in the consumer's contact database. Once stored, the contact containing the advertisement data may be readily searched for and retrieved by the consumer utilizing the consumer's contact manager software. The contact containing the advertisement data may also be replicated to other computing devices of the consumer.

Because the advertisement data may be delivered out-of-band to the consumer's device without disturbing the content being viewed by the consumer in the web browser application, a consumer not wanting to divert attention away from their current task may nevertheless select the embedded link to retrieve the advertisement data. The user may then access the stored advertisement data at a later time to research the advertised product or service or accept the related offer. This may result in more effective advertising as measured by response rates than traditional click-through advertising. Further, the types and variety of data that may be included in the advertisement data stored as a contact on the consumers computing device makes the persisted data more valuable to both the consumer and advertiser than a link bookmarked from a traditional click-through ad. These and other advantages and features will become apparent from a reading of the following disclosure and a review of the associated drawings.

It should be appreciated that the subject matter presented herein may be implemented as computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Moreover, those skilled in the art will appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, cellular telephone devices, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

Figure 1:
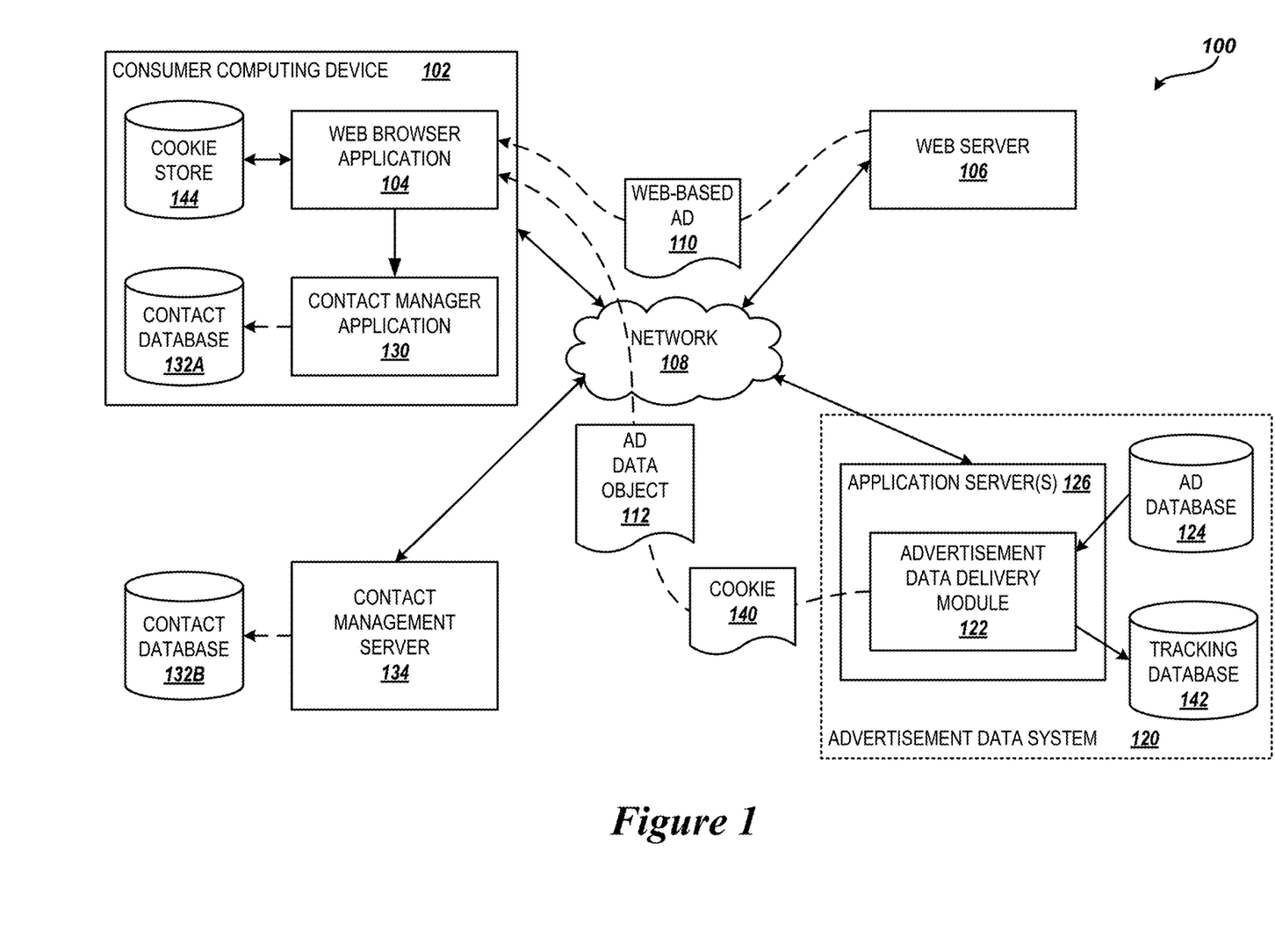
FIG. 1 is a system and network diagram showing aspects of an illustrative operating environment for persisting advertisement data to a consumer's computing device, including several software and hardware components provided by embodiments presented herein.

FIG. 1 and the following description are intended to provide a brief, general description of a suitable computing environment in which the embodiments described herein may be implemented. In particular, FIG. 1 is a system and network diagram that shows an illustrative operating environment 100 including several software components for persisting advertisement data on a computing device and tracking consumer access to the advertisement data, according to embodiments provided herein. The environment 100 includes a consumer computing device 102. The consumer computing device 102 may be a personal computer ("PC"), a desktop workstation, a laptop, a notebook, a wireless telephone, a personal digital assistant ("PDA"), a game console, a set-top box, a consumer electronics device, a server computer, and the like.

A web browser application 104 may execute on the consumer computing device 102 that accesses a web server 106 across a network 108 to retrieve webpages and other content and displays them to a user of the device ("the consumer"). The web browser application 104 may be the INTERNET EXPLORER® internet browser from MICROSOFT Corporation of Redmond, Wash., or the FIREFOX® web browser from MOZILLA Corporation of Mountain View, Calif., for example. The web server 106 may be one of any number of web server applications known in the art running on one or more server computers. The network 108 may represent one or more of a local-area network ("LAN"), a wide-area network ("WAN"), the Internet, or any other networking topology known in the art that connects the consumer computing device 102 to the web server 106 and other computer systems in the operating environment 100, as will be described below.

While the operating environment 100 illustrated in FIG. 1 includes a web browser application 104 communicating with a web server 106, it will be appreciated that the consumer may utilize any number of client application programs executing on the consumer computing device 102 to access and retrieve webpages and/or other content from a remote server computer across the network 108. It is intended that all such client application programs and remote server computers be included in the scope of this application.

In conjunction with the webpages and other content served by the web server 106 to the web browser application 104, the web server may transmit a web-based advertisement 110 to the web browser across the network 108. The web browser application 104 may display the web-based ad 110 to the consumer along with the webpages and other content served by the web server 106. The web-based ad 110 may include text, graphics, animation, video, audio, and other content that advertises a specific product or service of an advertiser, for example. The web-based ad 110 may also include a hyperlink, button, clickable icon, or other interactive user interface ("UI") control displayed to the consumer in the web browser application 104. The interactive UI control allows the consumer to initiate delivery of advertisement data corresponding to the product or service offered in the ad, as will be described below in regard to FIG. 4.

According to embodiments, if the consumer initiates delivery of the advertisement data, an advertisement data object 112 is transmitted to the consumer computing device 102. The advertisement data object 112 contains data regarding the advertiser as well as the product or service offered in the web-based advertisement 110, as will be described in more detail below in regard to FIG. 2. In one embodiment, the advertisement data object 112 is provided by an advertisement data system 120 connected to the network 108. For example, the consumer may click on an icon embedded in the web-based advertisement 110 displayed by the web browser application 104 which causes the browser to issue a request to the advertisement data system 120 for a specific advertisement data object 112 based on the content of the ad.

An advertisement data delivery module 122 executes in the advertisement data system 120 that responds to the request for delivery of the advertisement data object 112. The advertisement data delivery module 122 may retrieve the data for the specified advertisement data object 112 from an advertisement database 124 in the advertisement data system 120 that has been pre-populated with data for all advertisement data objects served by the system. The advertisement data delivery module 122 may execute on a single application server 126 or in parallel across multiple application servers in the advertisement data system 120. In addition, the advertisement data delivery module 122 may consist of a number of subcomponents executing on different application servers 126 or other computing devices in the advertisement data system 120. The advertisement data delivery module 122 may be implemented as software, hardware, or any combination of the two. It will be appreciated that the advertisement data object 112 may be requested and delivered from other sources beyond the advertisement data system described herein, including the web server 106 or some other service connected to the network 108 and configured to communicate with the web browser application 104.

Upon receiving the advertisement data object 112, the web browser application 104 will cause the advertisement data contained in the object to be persisted on the consumer computing device 102. As described above, the advertisement data object 112 may be delivered in a format that allows the advertisement data to be stored as a contact on the consumer computing device 102. For example, the advertisement data object 112 may delivered as a file in a format based on the VCARD™ specification published by the INTERNET MAIL CONSORTIUM of Santa Cruz, Calif. Upon receiving the advertisement data object 112 in the VCARD file format, the web browser application 104 may handoff the advertisement data object to a contact manager application 130 executing on the consumer computing device 102. The contact manager application 130 may be any application known in the art that recognizes the VCARD file format, such as the OUTLOOK® messaging and collaboration client from MICROSOFT Corporation or the Address Book application in the MAC OS® operating system software from APPLE, Inc. of Cupertino, Calif.

The contact manager application 130 may allow the consumer to view the advertisement data contained in the advertisement data object 112 and to store the data as a contact in a contact database 132A (also referred to herein as contact database 132) on the consumer computing device 102. Alternatively, the contact manager application 130 may store the contact created from advertisement data object 112 remotely in a contact database 132B hosted by a contact management server 134 across the network 108. The contact manager application 130 may also provide further services to the consumer for managing the contact created from the advertisement data object 112, such as categorizing, searching, retrieval, and viewing of the contact as well as replication of the contact to other computing devices of the consumer. It will be appreciated that the advertisement data object 112 may be delivered to the consumer computing device 102 in a format other than the VCARD file format described herein, including, but not limited to, a proprietary format that is stored and managed by a proprietary advertisement data management application executing on the computing device.

In conjunction with delivering the advertisement data object 112, the advertisement data delivery module 122 may also transmit additional data regarding the advertisement data object 112 to the consumer computing device 102. For example, the advertisement data delivery module 122 may transmit a cookie 140 to the web browser application 104 that contains a unique key associated with an entry in a tracking database 142. The entry in the tracking database 142 may contain information related to the delivery of the advertisement data object 112 that may be used to provide reporting data regarding the effectiveness of the web-based advertisement 110 and other information, as will be described in more detail below in regard to FIG. 3. Upon receiving the cookie 140, the web browser application 104 may store the cookie in a cookie store 144 on the consumer computing device 102 for later retrieval.

Figure 2:
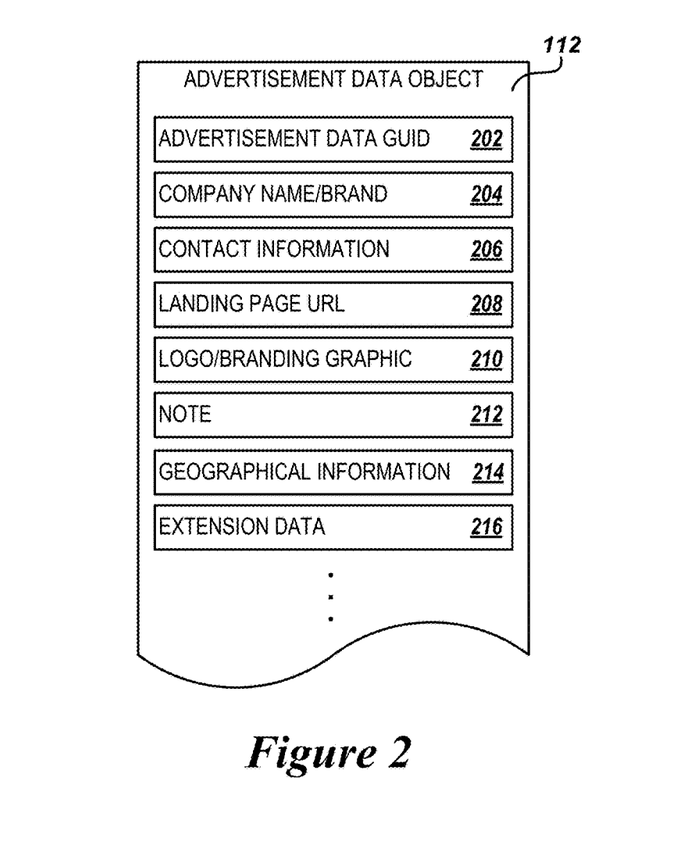
FIG. 2 is a data structure diagram illustrating a number of data elements stored in an advertisement data object, according to embodiments presented herein.
Figure 3:
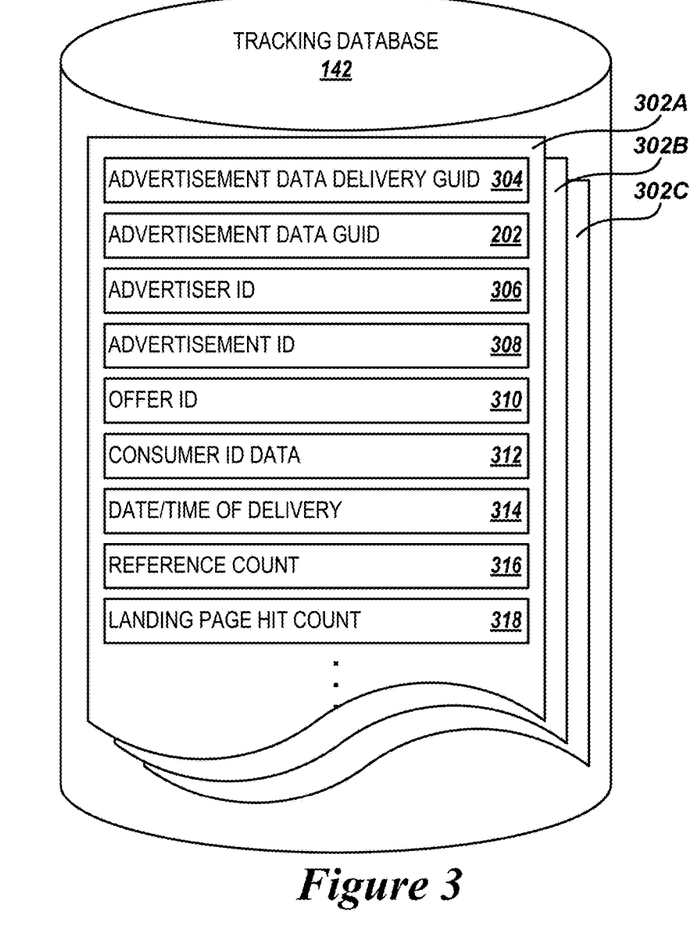
FIG. 3 is a data structure diagram illustrating a number of data structures and data elements stored in a tracking database, according to embodiments presented herein.

FIGS. 2 and 3 are data structure diagrams showing a number of data elements stored in a data structure. It will be appreciated by one skilled in the art that the data structures shown in the figures may represent rows in a database table, objects stored in a computer memory, programmatic structures, or any other data containers commonly known in the art. Each data element included in the data structures may represent one or more fields or columns of a database row, one or more attributes of an object, one or more member variables of a programmatic structure, or any other unit of data of a data structure commonly known in the art. The implementation is a matter of choice, and may depend on the technology, performance, and other requirements of the computing system upon which the data structures are implemented.

FIG. 2 shows one example of data elements that may be stored in the advertisement data object 112, according to embodiments. As described above, the advertisement data object 112 stores data regarding the advertiser as well as the product or service offered in the web-based advertisement 110. The number and types of data elements contained in the advertisement data object 112 may depend on the format in which the data object is delivered to the consumer computing device 102. For example, if the advertisement data object 112 is delivered to the consumer computing device 102 as a VCARD format file, the data elements included in the data object may be limited to those pertaining to the transmission of contact information according to the VCARD specification. The advertisement data object 112 may contain an advertisement data globally-unique identifier ("GUID") 202 that uniquely identifies the advertisement data object associated with the web-based advertisement 110. The advertisement data object 112 may also contain a company name or brand name 204 associated with the advertiser and/or product or service offered in the web-based advertisement 110. The company name or brand name 204 may be stored in the name attribute of the contact created from the advertisement data object 112, for example.

The advertisement data object 112 may contain contact information 206 for the advertiser associated with the web-based advertisement 110. The contact information 206 may include mailing addresses, e-mail addresses, telephone numbers, etc. Each of these data elements may be stored in the corresponding attribute of the contact created from the advertisement data object 112.

The advertisement data object 112 also contains a landing page URL 208 identifying a webpage ("landing page") where the consumer may go to retrieve more information regarding the product or service offered in the web-based advertisement 110. The landing page URL 208 may be stored in the webpage address attribute of the contact created from the advertisement data object 112, for example. The landing page URL 208 may further specify the advertisement data GUID 202 or other parameters that identify the offer associated with the web-based advertisement 110 to the web server hosting the corresponding landing page.

It will be appreciated that some time may pass between the time the web-based advertisement 110 was presented to the consumer and a time when the consumer may access the landing page specified by the landing page URL 208 stored in the contact created from the advertisement data object 112. In one embodiment, when the consumer navigates to the landing page, the web server hosting the landing page may utilize the parameters specified in the URL to generate and return updated information regarding the product or service offered in the original web-based advertisement 110. For example, if the consumer initiates delivery of the advertisement data object 112 to the consumer computing device 102 in response to a web-based advertisement 110 regarding a 2009 model automobile, sufficient time may elapse until the consumer accesses the associated landing page that the specific model of the automobile is no longer available. The advertiser in this case may configure the web server hosting the landing page to generate and return content regarding a newer or equivalent model automobile based on the automobile offered in the original web-based advertisement 110.

The advertisement data object 112 may further contain a logo or branding graphic 210 for the advertiser or brand associated with the web-based advertisement 110. Alternatively, the logo or branding graphic 210 may contain an image of the product or service offered in the web-based advertisement 110. The logo or branding graphic 210 may be stored in the picture or photo attribute of the contact created from the advertisement data object 112, for example. In one embodiment, the logo or branding graphic 210 may consist of a reference to an image stored in the advertisement data system 120 or another remote server. When the consumer utilizes the contact manager application 130 to access the contact created from the advertisement data object 112, the contact manager application may request the image specified in the logo or branding graphic 210 from the advertisement data system 120. In addition to providing the referenced image, the advertisement data system 120 may further utilize the request to track access by the consumer to the advertisement data persisted on the consumer computer device, as will be described in more detail below in regard to FIG. 6.

The advertisement data object 112 may include a note 212 containing text or hypertext markup language ("HTML") that provides additional information regarding the advertiser or the product or service offered in the web-based advertisement 110. The note 212 may be stored with the contact created from the advertisement data object 112, and the contents may be viewable by the consumer when the contact is accessed by the contact manager application 130, for example. The advertisement data object 112 may also include geographical information 214 regarding the advertisement, such as a store location in proximity to the consumer. The geographical information 214 may be stored with the contact created from the advertisement data object 112 and may be utilized by mapping applications on the consumer computing device 102 to show the advertiser's location on maps displayed to the consumer.

It will be appreciated that the advertisement data object 112 may contain fewer data elements than shown or may contain additional data elements containing information regarding the web-based advertisement 110 beyond those shown in FIG. 2 and described above. The advertisement data object 112 may further include extension data 216 that allows advertisement specific data to be included in the data object beyond the restrictions of the format chosen for delivery of the advertisement data object 112 to the consumer computing device 102. For example, the advertisement data object 112 may include data elements corresponding to a number of defined extensions to the VCARD specification, or the data object may contain proprietary extensions beyond those defined for the selected delivery format. It is intended that all such data elements included in the advertisement data object 112 be included in this application.

FIG. 3 shows one example of the structure of the tracking database 142 described above in regard to FIG. 1. As described above, the tracking database 142 may consist of tracking records 302A-302C (referred to herein generally as tracking record 302), each of which contain information related to the delivery of an advertisement data object 112 to a consumer computing device 102. The information contained in the tracking records 302 may be used to provide reporting data regarding the effectiveness of web-based advertisements 110 to the advertisers, for example. Each tracking record 302 may contain an advertisement data delivery GUID 304 that uniquely identifies the corresponding download of an advertisement data object 112. The advertisement data delivery GUID 304 may further be sent to the consumer computing device as a cookie 140 in conjunction with the delivery of the advertisement data object 112. This may allow future accesses to the advertiser's websites to be linked to the specific instance of delivery of the advertisement data object 112.

Each tracking record 302 may also contain the advertisement data GUID 202 from the advertisement data object 112 that was delivered to the consumer computing device. Identification of the advertisement data object 112 may allow the tracking record 302 to be associated with an advertiser as well as the product or service offered in the corresponding web-based advertisement 110. Alternatively or additionally, the tracking record may contain an advertiser ID 306, advertisement ID 308, and/or an offer ID 310 that may be used to link the tracking record 302 to a specific advertiser, web-based advertisement 110, and/or offer for products or services.

Each tracking record 302 further contains consumer ID data 312 that may identify the consumer computing device 102 or consumer to which the advertisement data object 112 was delivered. The consumer ID data 312 contained in the tracking record 302 may range from an Internet protocol ("IP") address of the consumer computing device 102 to personally identifiable information regarding the consumer. The consumer ID data 312 may be obtained from cookies or other information provided by the consumer to the advertiser or advertisement data system 120, for example. It will be appreciated that consumer ID data 312 regarding the consumer may only be collected by the advertisement data system 120 at the express consent of the consumer. Further, the advertisement data system 120 may provide the ability for the consumer to specify privacy options and preferences that determine what consumer ID data 312 may be collected, how such data may be utilized by the service, and what consumer ID data and other personal data may be shared with outside parties. Each tracking record 302 may also contain a date and time of delivery 314 of the advertisement data object 112 to the consumer computing device 102.

According to a further embodiment, each tracking record contains additional data elements to track the consumer's interaction with the advertisement data delivered in the advertisement data object 112 to the consumer computing device 102. For example, the tracking record 302 may contain a reference count 316 that tracks the number of times the contact created from the advertisement data object 112 is viewed in the contact manager application 130 on the consumer computing device 102. This may be accomplished by including a reference to an image stored in the advertisement data system 120 in the logo or branding graphic 210 contained in the advertisement data object 112, as described above in regard to FIG. 2. When the consumer utilizes the contact manager application 130 to access the contact created from the advertisement data object 112, the contact manager application may request the image specified in logo or branding graphic 210 from the advertisement data system 120. The advertisement data system 120 may respond to the request with the image as well as increment the reference count 316 contained in the tracking record 302 corresponding to the delivery of the advertisement data object 112, as will be described in more detail below in regard to FIG. 6.

In addition, the tracking record 302 may contain a landing page hit count 318 that tracks the number of times the consumer accesses the landing page specified by the landing page URL 208 contained in the advertisement data object 112, as will be described in more detail below in regard to FIG. 7. The landing page hit count 318 for all tracking records associated with a particular web-based advertisement 110 may be used to calculate a click-through rate for the ad, for example. It will be appreciated that the tracking records 302 may contain additional data elements beyond those shown in FIG. 3 and described above that are utilized by the advertisement data system 120 to track the consumer's interaction with the advertisement data delivered in the advertisement data object 112 and the effectiveness of the corresponding web-based advertisement 110.

Figure 4:
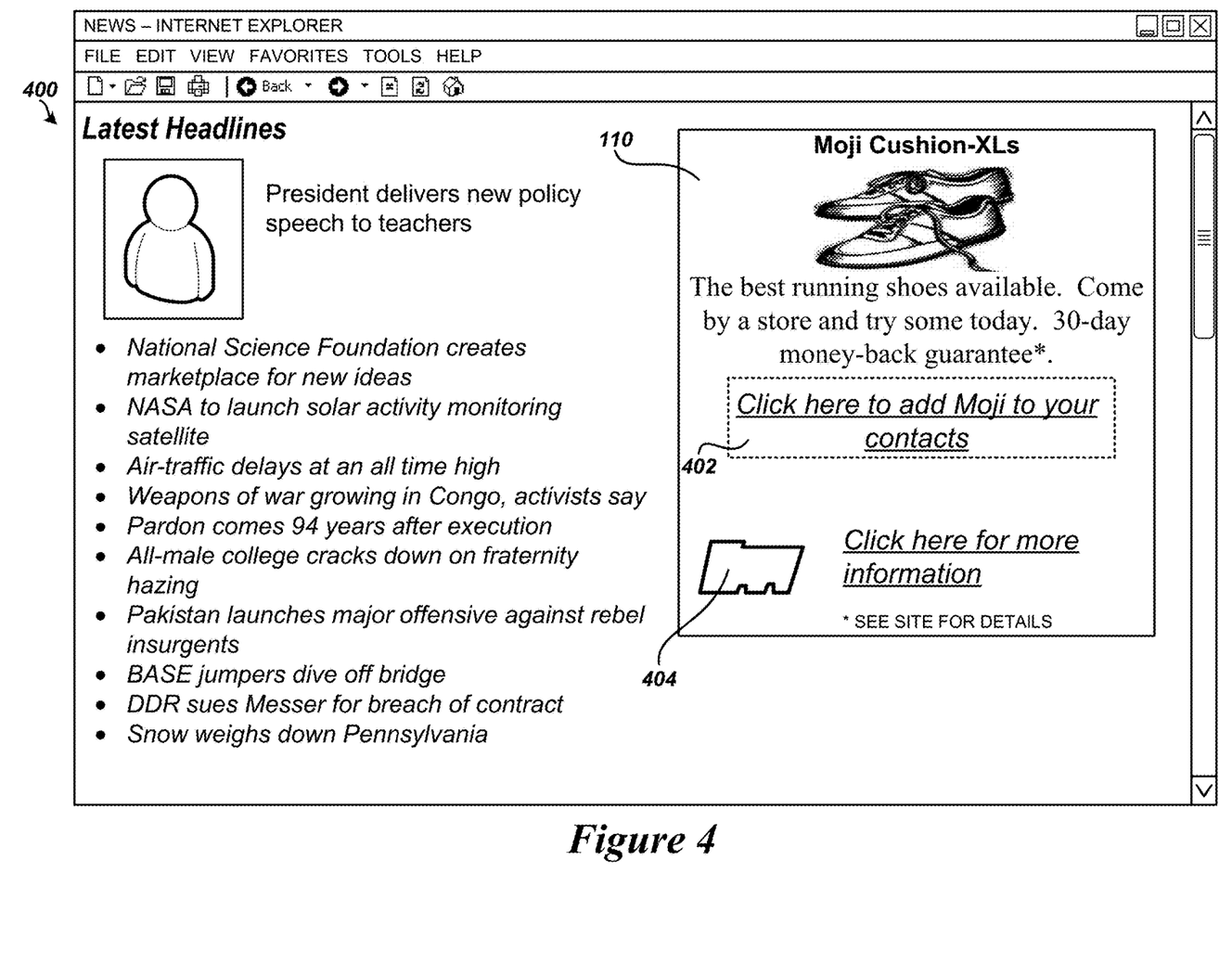
FIG. 4 is a display diagram showing an illustrative user interface for initiating the delivery of advertisement data to the consumer computing device, according to embodiments presented herein.

FIG. 4 shows an illustrative user interface 400 containing a web-based advertisement 110 as displayed by the web browsing application 104 to a consumer, according to one embodiment. As described above in regard to FIG. 1, the web-based advertisement 110 may include text, graphics, animation, video, audio, and other content that advertises a specific product or service of an advertiser. According to one embodiment, the web-based advertisement 110 also includes a hyperlink 402, a clickable icon 404, and/or other interactive UI controls embedded in the ad that allows the consumer to initiate delivery of the advertisement data object 112 corresponding to the ad to the consumer computing device.

In another embodiment, selecting the interactive UI control 402, 404 in the web-based advertisement 110 causes the web browser application 104 to display corresponding advertisement data to the consumer in the UI 400. For example, the web-based advertisement 110 may be replaced with a graphical representation of a business card containing the advertisement data corresponding to the ad. The graphical representation of the business card may contain a further interactive UI control that allows the consumer to initiate delivery of the corresponding advertisement data object 112 to the consumer computing device 102. It will be appreciated that other user interfaces and controls may be conceived that may be displayed by the web browser application 104 in conjunction with the web-based advertisement 110 to allow the consumer to initiate delivery of the corresponding advertisement data object 112 to the consumer computing device 102, including, but not limited to, a pushbutton, a context menu item, a toolbar button, and the like.

Figure 5:
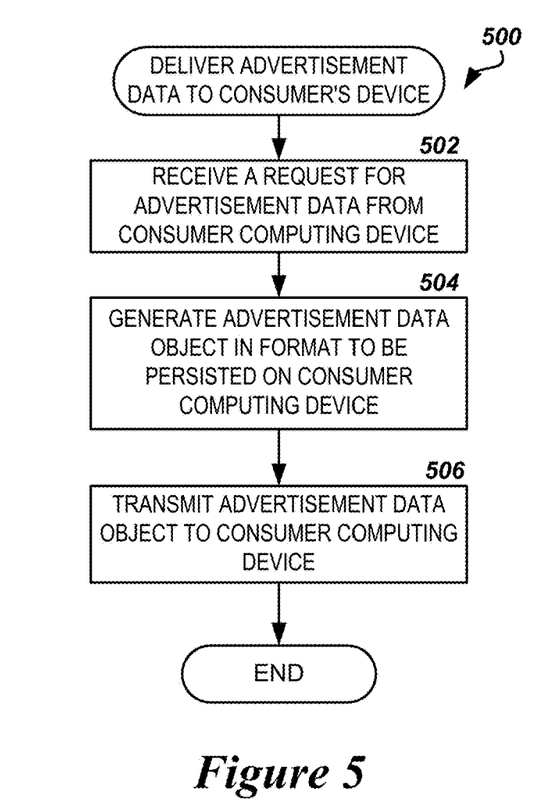
FIG. 5 is a flow diagram showing methods for delivering advertisement data to the consumer computing device, according to embodiments described herein.
Figure 6:
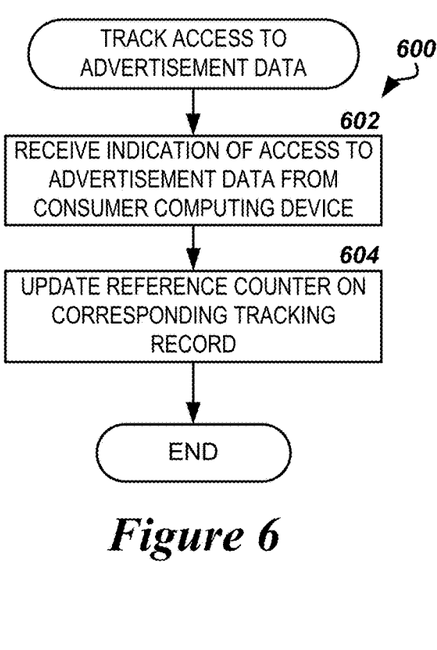
FIG. 6 is a flow diagram showing methods for tracking access by the consumer to advertisement data persisted on the consumer computing device, according to embodiments described herein.
Figure 7:
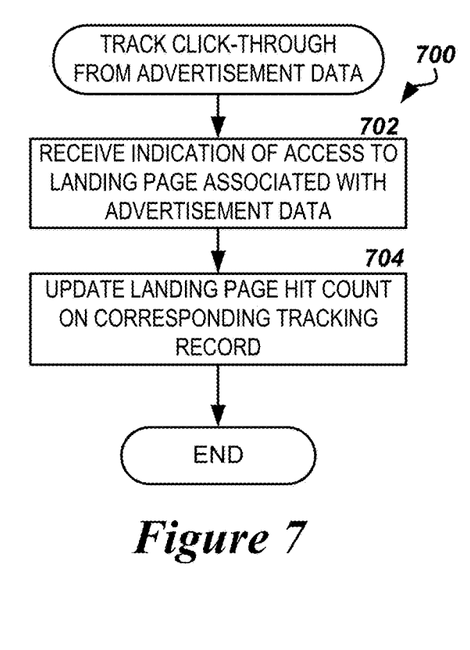
FIG. 7 is a flow diagram showing methods for tracking click-throughs from the advertisement data persisted on the consumer computing device, according to embodiments described herein.

Turning now to FIGS. 5-7, additional details will be provided regarding the embodiments presented herein for persisting advertisement data on a computing device and tracking consumer access to the advertisement data. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIG. 5 illustrates a routine 500 for delivering an advertisement data object 112 to the consumer computing device, according to embodiments described herein. In one embodiment, the routine 500 is performed by the advertisement data delivery module 122. It will be appreciated that the routine 500 may also be performed by another module or component of the advertisement data system 120, or by a combination of modules and components.

The routine 500 begins at operation 502, where the advertisement data delivery module 122 receives a request for advertisement data from the consumer computing device 102. As described above in regard to FIG. 4, the request may result from the consumer selecting an interactive UI control 402, 404 displayed by the web browser application 104 in conjunction with a web-based advertisement 110. The request may specify the specific advertisement data to be delivered as well as the format in which to deliver the data.

In one embodiment, the request comprises a hypertext transfer protocol ("HTTP") request for a file in the VCARD format, as described above in regard to FIG. 1. The HTTP request may further include a parameter specifying an advertisement data GUID 202 corresponding to the advertisement data to be delivered. In other embodiments, the type of request and the format in which the advertisement data is to be delivered may vary based on the type and/or capabilities of the consumer computing device 102 making the request. For example, the web-based advertisement 110 may contain scripting code or other logic that allows the web browser application 104 to determine the types of applications installed on the consumer computing device 102 with which the advertisement data may be persisted to the device. It will be appreciated that the request for advertisement data may be any type of request known in the art that may be transmitted from the consumer computing device 102 to the advertisement data system 120 over the network 108.

From operation 502, the routine 500 proceeds to operation 504, where the advertisement data delivery module 122 generates an advertisement data object 112 for delivery to the consumer computing device 102 based on the advertisement data requested by the device. The advertisement data delivery module 122 may utilize the parameters of the request to retrieve the requested data from the advertisement database 124. The advertisement data delivery module 122 may the create the advertisement data object 112 using the retrieved data in the requested format. For example, the advertisement data delivery module 122 may generate a VCARD format file containing the retrieved data elements based on the received request.

Next, the routine 500 proceeds from operation 504 to operation 506, where the advertisement data delivery module 122 transmits the advertisement data object 112 in the requested format to the consumer computing device 102. According to embodiments, upon receiving the advertisement data object 112, the web browser application 104 will cause the advertisement data stored in the object to be persisted on the consumer computing device 102, as described above in regard to FIG. 1. For example, upon receiving an advertisement data object 112 delivered in the VCARD file format, the web browser application 104 may handoff the advertisement data object to the contact manager application 130.

The contact manager application 130 may then allow the consumer to view the advertisement data contained in the advertisement data object 112 and to store the data as a contact in the contact database 132. The contact manager application 130 may also provide further services to the consumer for managing the contact created from the advertisement data object 112, such as categorizing, searching, retrieval, and viewing of the contact as well as replication of the contact to other computing devices of the consumer. From operation 506, the routine 500 ends.

FIG. 6 illustrates a routine 600 for tracking access to the advertisement data delivered to the consumer computing device 102 by the consumer, according to the embodiments described herein. In one embodiment, the routine 600 is performed by the advertisement data delivery module 122. It will be appreciated that the routine 600 may also be performed by another module or component of the advertisement data system 120, or by a combination of modules and components. As described above, the contact manager application 130 or other application on the consumer computing device 102 may allow the consumer to retrieve and view the advertisement data contained in the advertisement data object 112 delivered to the device. The advertisement data delivery module 122 may track these accesses to the advertisement data for generating reporting data for the advertiser regarding the effectiveness of the corresponding web-based advertisement 110, according to embodiments.

The routine 600 begins at operation 602, where the advertisement data delivery module 122 receives an indication from the consumer computing device 102 that the advertisement data has been accessed by the consumer. According to one embodiment, the indication consists of a request received from the consumer computing device 102 as the result of a reference to an image in the logo or branding graphic 210 or a tracking pixel embedded in HTML content in the note 212 contained in the advertisement data object 112 delivered to the device, as described above in regard to FIG. 3. In another embodiment, the indication may be sent to the advertisement data system 120 by the contact manager application 130 or other application upon access by the consumer to the advertisement data contained in the advertisement data object 112.

From operation 602, the routine 600 proceeds to operation 604, where the advertisement data delivery module 122 increments the reference count 316 contained in the tracking record 302 in the tracking database 142 corresponding to the advertisement data object 112 delivered to the consumer computing device 102. The corresponding tracking record 302 may be determined by utilizing the advertisement data delivery GUID 304 contained in the cookie 140 accompanying the indication received from the consumer computing device 102, according to one embodiment. The cookie 140 may have been previously sent to the consumer computing device 102 in conjunction with the delivery of the advertisement data object 112, as described above in regard to FIG. 1. From operation 604, the routine 600 ends.

FIG. 7 illustrates a routine 700 for tracking click-throughs to the landing page corresponding to the web-based advertisement 110 from the advertisement data delivered to the consumer computing device 102, according to the embodiments described herein. In one embodiment, the routine 700 is performed by the advertisement data delivery module 122. It will be appreciated that the routine 700 may also be performed by another module or component of the advertisement data system 120, or by a combination of modules and components. As described above, the advertisement data object 112 delivered to the consumer computing device 102 may include a landing page URL 208 specifying a landing page where the consumer may receive additional information regarding the advertiser and/or the product or service offered in the corresponding web-based advertisement 110. The landing page URL 208 may be made available to the consumer through the contact manager application 130 or other application on the consumer computing device 102 used to store and manage the advertisement data on the device. The advertisement data delivery module 122 may track accesses to the landing page specified by the landing page URL 208 for calculating click-through rates and generating other reporting data for the advertiser regarding the effectiveness of the corresponding web-based advertisement 110, according to embodiments.

The routine 700 begins at operation 702, where the advertisement data delivery module 122 receives an indication that the landing page has been accessed by the consumer. The indication may be received from the consumer computing device 102, such as through a request for an image or tracking pixel embedded in the HTML content of the landing page, for example. Alternatively, the indication may be sent to the advertisement data system 120 by the web server 106 hosting the landing page through script code or other mechanism.

From operation 702, the routine 700 proceeds to operation 704, where the advertisement data delivery module 122 increments the landing page hit count 318 contained in the tracking record 302 in the tracking database 142 corresponding to the advertisement data object 112 delivered to the consumer computing device 102. The corresponding tracking record 302 may be determined by utilizing the advertisement data delivery GUID 304 contained in the cookie 140 accompanying the indication received from the consumer computing device 102, according to one embodiment. The cookie 140 may have been previously sent to the consumer computing device 102 in conjunction with the delivery of the advertisement data object 112, as described above in regard to FIG. 1. From operation 704, the routine 700 ends.

In another embodiment, the advertisement data delivery module 122 or the web server 106 hosting the landing page may be configured to automatically update the advertisement data object 112 stored on the consumer computing device 102 upon access to the landing page. Upon receiving the indication that the landing page has been accessed from the consumer computing device 102, the advertisement data delivery module 122 may determine the "version" of the advertisement data object 112 on the consumer computing device 102. The version may be determined by accessing the date and time of delivery 314 or the advertisement data GUID 202 stored in the tracking record 302 corresponding to the advertisement data object 112 delivered to the consumer computing device 102. Alternatively, the advertisement data GUID 202 may be specified in the page parameters for the landing page, as described above in regard to FIG. 2.

The advertisement data delivery module 122 may then determine whether new or updated advertisement data is available in the advertisement database 124. If so, the advertisement data delivery module 122 may generate a new advertisement data object 112 in the required format and transmit the advertisement data object to the consumer computing device 102. The new advertisement data object 112 may be transmitted to the consumer computing device 102 out-of-band in order not to disturb the current viewing of the landing page in the web browser application 104 by the consumer, for example.

According to embodiments, upon receiving the new advertisement data object 112, the web browser application 104 will cause the advertisement data object stored on the consumer computing device 102 to be replaced with the new version. For example, upon receiving a new advertisement data object 112 delivered in the VCARD file format, the web browser application 104 may handoff the advertisement data object to the contact manager application 130. The contact manager application 130 may then prompt the consumer as to whether the consumer wishes to replace the contact created from the advertisement data object 112 with the new data received.

Figure 8:
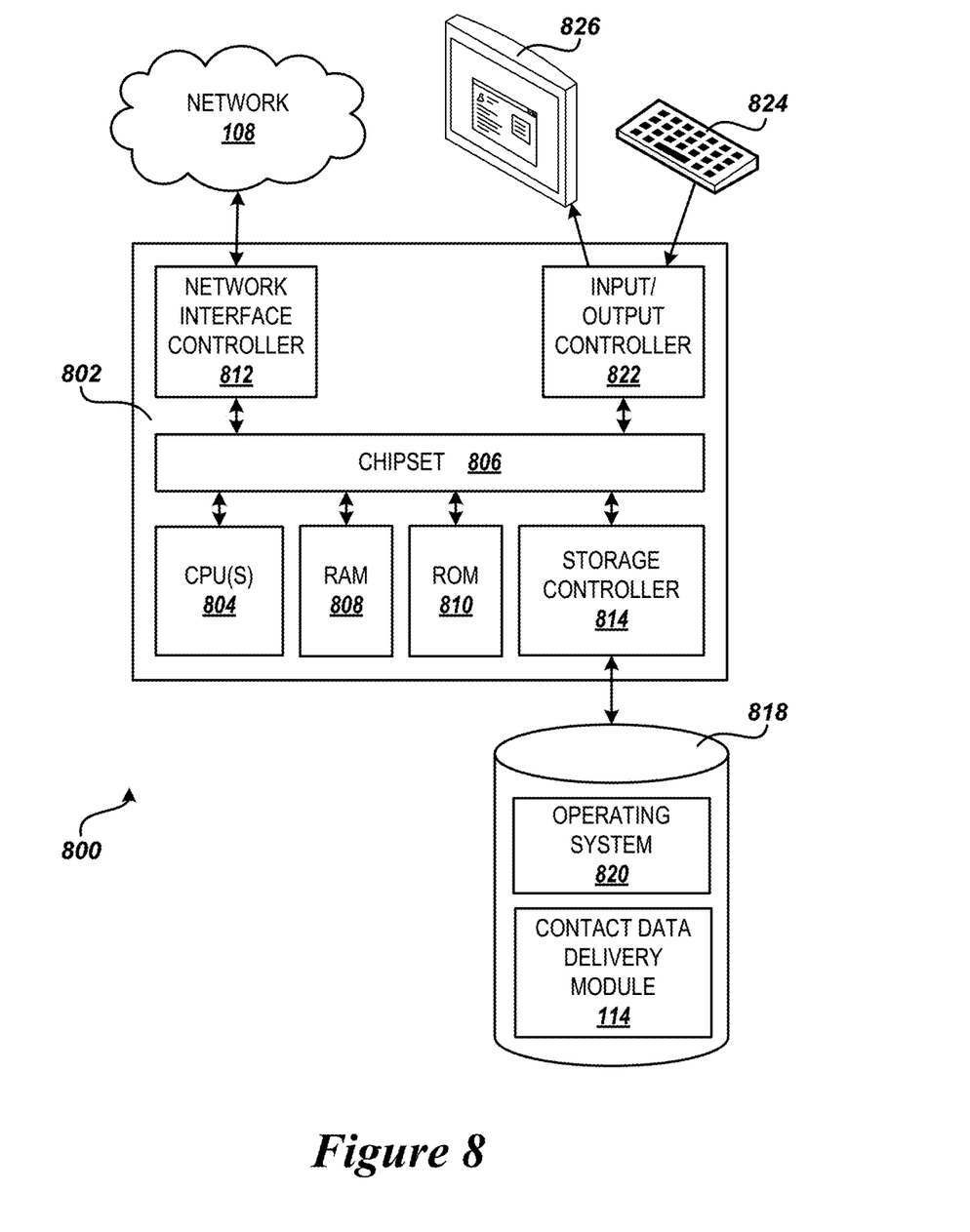
FIG. 8 is a computer architecture diagram showing an illustrative computer hardware architecture for computing devices described in embodiments presented herein.

FIG. 8 shows an example computer architecture 800 for a computer 802 capable of executing the software components described herein for persisting advertisement data on a computing device and tracking consumer access to the advertisement data, in the manner presented above. The computer architecture 800 shown in FIG. 8 illustrates a conventional server computer, workstation, desktop computer, laptop, network appliance, personal digital assistant ("PDA"), digital cellular phone, or other computing device, and may be utilized to execute any aspects of the software components presented herein described as executing on the application servers 126, the consumer computing device 102, or other computing platform.

The computer 802 includes a baseboard, or "motherboard," which is a printed circuit board to which a multitude of components or devices may be connected by way of a system bus or other electrical communication paths. In one illustrative embodiment, one or more central processing units ("CPUs") 804 operate in conjunction with a chipset 806. The CPUs 804 are standard programmable processors that perform arithmetic and logical operations necessary for the operation of the computer 802.

The CPUs 804 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 806 provides an interface between the CPUs 804 and the remainder of the components and devices on the baseboard. The chipset 806 may provide an interface to a random access memory ("RAM") 808, used as the main memory in the computer 802. The chipset 806 may further provide an interface to a computer-readable storage medium such as a read-only memory ("ROM") 810 or non-volatile RAM ("NVRAM") for storing basic routines that that help to startup the computer 802 and to transfer information between the various components and devices. The ROM 810 or NVRAM may also store other software components necessary for the operation of the computer 802 in accordance with the embodiments described herein.

According to various embodiments, the computer 802 may operate in a networked environment using logical connections to remote computing devices and computer systems through the network 108. The chipset 806 includes functionality for providing network connectivity through a network interface controller ("NIC") 812, such as a gigabit Ethernet adapter. The NIC 812 is capable of connecting the computer 802 to other computing devices over the network 108, such as the consumer computing device 102, the web server 106, the contact management server 134, other application servers 126 in the advertisement data system 120, and the like. It should be appreciated that any number of NICs 812 may be present in the computer 802, connecting the computer to other types of networks and remote computer systems.

The computer 802 may be connected to a mass storage device 818 that provides non-volatile storage for the computer. The mass storage device 818 may store system programs, application programs, other program modules, and data, which are described in greater detail herein. The mass storage device 818 may be connected to the computer 802 through a storage controller 814 connected to the chipset 806. The mass storage device 818 may consist of one or more physical storage units. The storage controller 814 may interface with the physical storage units through a serial attached SCSI ("SAS") interface, a serial advanced technology attachment ("SATA") interface, a fiber channel ("FC") interface, or other standard interface for physically connecting and transferring data between computers and physical storage units.

The computer 802 may store data on the mass storage device 818 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 818 is characterized as primary or secondary storage, and the like. For example, the computer 802 may store information to the mass storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 802 may further read information from the mass storage device 818 by detecting the physical states or characteristics of one or more particular locations within the physical storage units.

In addition to the mass storage device 818 described above, the computer 802 may have access to other computer-readable storage medium to store and retrieve information, such as program modules, data structures, or other data. It should be appreciated by those skilled in the art that computer-readable storage media can be any available media that may be accessed by the computer 802. By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information.

The mass storage device 818 may store an operating system 820 utilized to control the operation of the computer 802. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized.

The mass storage device 818 may store other system or application programs and data utilized by the computer 802, such as the advertisement data delivery module 122 described above in regard to FIG. 1. In one embodiment, the mass storage device 818 or other computer-readable storage media may be encoded with computer-executable instructions that, when loaded into the computer 802, may transform the computer from a general-purpose computing system into a special-purpose computer capable of implementing the embodiments described herein. These computer-executable instructions transform the computer 802 by specifying how the CPUs 804 transition between states, as described above. According to one embodiment, the computer 802 may have access to computer-readable storage media storing computer-executable instructions that, when executed by the computer, perform the routines 500, 600, and 700 for persisting advertisement data on a computing device and tracking consumer access to the advertisement data, as described above in regard to FIGS. 5-7.

The computer 802 may also include an input/output controller 822 for receiving and processing input from a number of input devices 824, such as a keyboard, a mouse, a touchpad, a touch screen, an electronic stylus, or other type of input device. Similarly, the input/output controller 822 may provide output to a display device 826, such as a computer monitor, a flat-panel display, a digital projector, a printer, a plotter, or other type of output device. It will be appreciated that the computer 802 may not include all of the components shown in FIG. 8, may include other components that are not explicitly shown in FIG. 8, or may utilize an architecture completely different than that shown in FIG. 8.

Based on the foregoing, it should be appreciated that technologies for persisting advertisement data on a computing device and tracking consumer access to the advertisement data are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method for persisting advertisement data on a consumer computing device, the method comprising performing instructions under the control of a computer system for:
   transmitting, over a network, a web-based advertisement to a consumer computing device, the web-based advertisement including an interactive user interface control;
   receiving a request over the network for advertisement data from the consumer computing device, wherein the request for advertisement data is generated by user selection of the interactive user interface control;
   in response to receiving the request for advertisement data from the consumer computing device, generating a VCARD format file containing information regarding a product or service offered in the web-based advertisement and a reference to a webpage containing information regarding the product or service offered in the web-based advertisement;
   transmitting, over the network, the VCARD format file and a cookie to the consumer computing device, wherein the VCARD format file is configured for storage as a contact on the consumer computing device, and the cookie comprises a data delivery identifier that uniquely identifies the transmitting of the VCARD format file to the consumer computing device, and wherein the VCARD format file causes the consumer computing device to display the contact;
   detecting access to the webpage by the consumer computing device, the access comprising selection of the webpage reference included in the contact; and
   upon detecting the access to the webpage referenced in the contact, updating a landing page hit count maintained in a tracking record associated with the data delivery identifier.

2. The computer-implemented method of claim 1, wherein the tracking record comprises one or more of: an advertisement data identifier identifying the advertisement data used to generate the VCARD format file;
   an advertiser identifier identifying an advertiser associated with the web-based advertisement;
   an advertisement identifier identifying the web-based advertisement;
   an offer identifier identifying an offer associated with the advertiser;
   a consumer computing device identifier identifying the consumer computing device;
   consumer data associated with a consumer corresponding to the consumer computing device;
   a date and time of the transmitting of the VCARD format file;
   a reference count indicating a number of times that the contact is viewed on the consumer computing device; or
   the landing page hit count indicating a number of times that the webpage referenced in the contact is accessed via the contact.

3. A computer-readable storage medium having computer-executable instructions stored thereon that, when executed by a computer, cause the computer to:
   receive a request for advertisement data from a consumer computing device, wherein the request for advertisement data is generated by a user of the consumer computing device by selecting an interactive user interface control in a web-based advertisement;
   in response to receiving the request for advertisement data from the consumer computing device, generate an advertisement data object containing the requested advertisement data and information regarding a product or service offered in the web-based advertisement; and
   transmit, over a network, the advertisement data object and a data delivery identifier to the consumer computing device, wherein the advertisement data object is configured for storage as a contact on the consumer computing device, and the data delivery identifier uniquely identifies the transmission of the advertisement data object to the consumer computing device, and wherein the advertisement data object causes the consumer computing device to display the contact.

4. The computer-readable storage medium of claim 3, wherein the advertisement data object comprises a reference to a webpage containing information regarding the product or service offered in the web-based advertisement.

5. The computer-readable storage medium of claim 3, wherein the advertisement data object comprises an image or a reference to an image associated with the product or service offered in the web-based advertisement.

6. The computer-readable storage medium of claim 3, having additional computer-executable instructions stored thereon that further cause the computer to maintain a tracking record containing information identifying the consumer computing device and the advertisement data object transmitted to the consumer computing device.

7. The computer-readable storage medium of claim 6, having additional computer-executable instructions stored thereon that further cause the computer to:
   receive an indication of access to the contact on the consumer computing device created from the advertisement data object, the indication of access to the contact comprising a request for an image referenced by the contact; and
   upon receiving the indication of access to the contact, update a reference count maintained in the tracking record.

8. The computer-readable storage medium of claim 6, having additional computer-executable instructions stored thereon that further cause the computer to:
   receive an indication of access to a webpage containing information regarding the product or service offered in the web-based advertisement, wherein a reference to the webpage is contained in the contact on the consumer computing device created from the advertisement data object; and
   upon receiving the indication of access to the webpage, updating a landing page hit count maintained in the tracking record.

9. A computer-implemented method for persisting advertisement data on a consumer computing device, the method comprising performing instructions under the control of a computer system for:
   receiving a request for advertisement data from the consumer computing device, wherein the request for advertisement data is generated by a user of the consumer computing device selecting an interactive user interface control in a web-based advertisement;
   in response to receiving the request for advertisement data from the consumer computing device, generating an advertisement data object containing the requested advertisement data, wherein a format of the advertisement data object facilitates the advertisement data being stored and accessed as a contact on the consumer computing device; and
   transmitting, over a network, the advertisement data object and a data transmission identifier to the consumer computing device, wherein the advertisement data object is configured for storage as a contact on the consumer computing device and the data transmission identifier uniquely identifies the transmitting of the advertisement data object to the consumer computing device, and wherein the advertisement data object causes the consumer computing device to display the contact.

10. The computer-implemented method of claim 9, wherein the advertisement data object comprises a file in a format based upon a VCARD specification.

11. The computer-implemented method of claim 9, wherein the advertisement data object contains a reference to a webpage containing information regarding a product or service offered in the web-based advertisement.

12. The computer-implemented method of claim 9, wherein the advertisement data object contains an image or a reference to an image associated with a product or service offered in the web-based advertisement.

13. The computer-implemented method of claim 9, wherein the interactive user interface control comprises a hyperlink embedded in the web-based advertisement.

14. The computer-implemented method of claim 9, wherein the interactive user interface control comprises a clickable icon in the web-based advertisement.

15. The computer-implemented method of claim 9, further comprising maintaining a tracking record containing information identifying the consumer computing device and the advertisement data object transmitted to the consumer computing device.

16. The computer-implemented method of claim 15, wherein maintaining the tracking record further comprises:
   receiving an indication of access to the contact on the consumer computing device created from the advertisement data object, the indication of access to the contact comprising a request for an image referenced by the contact; and
   upon receiving the indication of access to the contact, updating a reference count maintained in the tracking record.

17. The computer-implemented method of claim 15, wherein maintaining the tracking record further comprises:
   receiving an indication of access to a webpage containing information regarding the product or service offered in the web-based advertisement, wherein a reference to the webpage is contained in the contact on the consumer computing device created from the advertisement data object; and
   upon receiving the indication of access to the webpage, updating a landing page hit count maintained in the tracking record.

18. A computer-readable storage medium having computer-executable instructions stored thereon that, when executed by a computer, cause the computer to:
   receive a request for advertisement data from a consumer computing device, wherein the request for advertisement data is generated by a user of the consumer computing device by selecting an interactive user interface control in a web-based advertisement;
   in response to receiving the request for advertisement data from the consumer computing device, generate an advertisement data object containing the requested advertisement data, wherein the advertisement data comprises information regarding a product or service offered in the web-based advertisement;
   transmit, over a network to the consumer computing device, the advertisement data object for storage as a contact on the consumer computing device, and a data transmission identifier that uniquely identifies the transmission of the advertisement data object to the consumer computing device, wherein the advertisement data object causes the consumer computing device to display the contact;
   receive an indication of access by the consumer computing device to a webpage containing information regarding the product or service offered in the web-based advertisement, wherein a reference to the webpage is contained in the advertisement data object; and
   upon receiving the indication of access to the webpage, update a landing page hit count maintained in a tracking record.

19. The computer-readable storage medium of claim 18, having additional computer-executable instructions stored thereon that further cause the computer to:
   receive an indication of access to the advertisement data object on the consumer computing device, the indication of access to the contact comprising a request for an image referenced by the contact; and upon receiving the indication of access to the advertisement data object, update a reference count maintained in the tracking record.

20. The computer-readable storage medium of claim 18, wherein the advertisement data object comprises a file in a format based upon a VCARD specification.

21. A system for persisting advertisement data on a consumer computing device, the system comprising:
   a processing unit;
   a display device;
   an input device;
   a network interface controller configured to connect the consumer computing device to other devices;
   memory storing instructions executable by the processing unit and that, when executed by the processing unit, configure the system to perform operations including:
      receiving, via the network interface controller, a web-based advertisement including an interactive user interface;
      displaying, via the display device, the web-based advertisement including the interactive user interface;
      receiving, via the input device, a user interaction with the web-based advertisement;
      responsive to the user interaction with the web-based advertisement, sending a request, via the network interface controller, for delivery of persistent advertisement data related to the web-based advertisement;
      responsive to the request, receiving, via the network interface controller, a file configured to be storable as a contact in a contact database accessible by the consumer computing device, the file being the persistent advertisement data and the file including data related to a product or service offered in the web-based advertisement; and
      causing the file to be stored as a contact in the contact database accessible by the consumer computing device.

22. The system of claim 21, wherein the file is in a format based upon a VCARD specification.

23. The system of claim 21, wherein the file contains a reference to a webpage containing information regarding the product or service offered in the web-based advertisement and an image or a reference to an image associated with the product or service offered in the web-based advertisement.

24. The system of claim 21, wherein the interactive user interface control comprises a hyperlink embedded in the web-based advertisement.

25. The system of claim 21, wherein the interactive user interface control comprises a clickable icon in the web-based advertisement.

* * * * *